(12) United States Patent
Nakamoto et al.

(10) Patent No.: US 8,234,895 B2
(45) Date of Patent: Aug. 7, 2012

(54) KEY APPARATUS

(75) Inventors: Yuji Nakamoto, Aichi-ken (JP);
Hirofumi Goshima, Aichi-ken (JP);
Tomonori Kawachi, Aichi-ken (JP)

(73) Assignee: Kabushiki Kaisha Tokai-Rika-Denki-Seisakusho, Aichi-Ken (JP)

(*) Notice: Subject to any disclaimer, the term of this patent is extended or adjusted under 35 U.S.C. 154(b) by 202 days.

(21) Appl. No.: 12/508,499

(22) Filed: Jul. 23, 2009

(65) Prior Publication Data
US 2010/0024495 A1    Feb. 4, 2010

(30) Foreign Application Priority Data

Jul. 29, 2008    (JP) .................................. 2008-195371

(51) Int. Cl.
*B60R 25/02* (2006.01)

(52) U.S. Cl. ................ 70/252; 70/182; 70/183; 70/184; 70/185; 70/186; 70/DIG. 30

(58) Field of Classification Search ............ 70/182–186, 70/252, DIG. 30; 200/43.03, 43.04, 43.08, 200/43.11
See application file for complete search history.

(56) References Cited

U.S. PATENT DOCUMENTS

| | | | | |
|---|---|---|---|---|
| 3,959,996 A | * | 6/1976 | Thirion | 70/186 |
| 4,099,395 A | * | 7/1978 | Garza | 70/360 |
| 4,685,313 A | * | 8/1987 | Neyret | 70/186 |
| 6,327,882 B1 | * | 12/2001 | Canard | 70/186 |
| 6,786,069 B2 | * | 9/2004 | Ochi | 70/252 |

FOREIGN PATENT DOCUMENTS

| | | |
|---|---|---|
| JP | 2007-247314 A | 9/2007 |
| JP | 2007247314 A * | 9/2007 |

* cited by examiner

*Primary Examiner* — Lloyd Gall
*Assistant Examiner* — Ifeolu Adeboyejo
(74) *Attorney, Agent, or Firm* — Roberts Mlotkowski Safran & Col P.C.

(57) ABSTRACT

There is provided a key apparatus, including: a key cylinder that is rotatable when a vehicle key is inserted; and an accommodating portion in which an assembling member is assembled in a body member, the body member and the assembling member form an inner surface, and the key cylinder is accommodated in the inner surface.

8 Claims, 4 Drawing Sheets

KEY APPARATUS

CROSS-REFERENCE TO RELATED APPLICATION

This application claims priority under 35 USC 119 from Japanese Patent Application No. 2008-195371 filed on Jul. 29, 2008, the disclosure of which is incorporated by reference herein.

BACKGROUND OF THE INVENTION

1. Technical Field

The present invention relates to a key apparatus in which a vehicle key is inserted into a key cylinder and rotatable therein.

2. Related Art

In key apparatuses, an ignition cylinder (key cylinder) is generally accommodated in a lock body (accommodating tube) formed in the shape of a cylinder having a bottom (for example, refer to Japanese Patent Application Laid-Open (JP-A) No. 2007-247314).

In the key apparatuses, when the lock body is manufactured, it is needed to draw a mold in the lock body from an opening end (end where the ignition cylinder is accommodated) of the lock body.

Here, it is assumed that an inner circumferential surface at the side of the opening end of the lock body exists at an inner side of a radial direction of the lock body, with respect to the side of a closing end (side opposite to the opening end) of the lock body. In this case, since a core cannot be installed in the lock body, the mold cannot be drawn from the opening end of the lock body, which makes it impossible to manufacture the lock body.

For this reason, the inner circumferential surface at the side of the opening end of the lock body needs to exist at a corresponding position in the radial direction of the lock body or an external position of the radial direction of the lock body, with respect to the side of the closing end of the lock body. Therefore, it is not possible to decrease a size of the lock body at the side of the opening end.

SUMMARY OF THE INVENTION

Accordingly, the present invention has been made to solve the above-described problems, and it is an object of the invention to provide a key apparatus that can decrease a size of an accommodating portion.

A key apparatus according to a first aspect of the present invention includes:

a key cylinder that is rotatable when a vehicle key is inserted; and an accommodating portion in which an assembling member is assembled in a body member, the body member and the assembling member form an inner surface, and the key cylinder is accommodated in the inner surface.

In a key apparatus according to a second aspect of the present invention, in the key apparatus according to the first aspect, the accommodating portion has a tube portion that is provided with a bottom portion, the body member forms the tube portion, and the assembling member forms the bottom portion.

In a key apparatus according to a third aspect of the present invention, in the key apparatus according to the first aspect, the accommodating portion has a tube portion that is provided with a bottom portion, the body member forms the tube portion and the bottom portion, and the assembling member forms the tube portion.

In the key apparatus according to the first aspect of the invention, the key cylinder is accommodated in the inner surface of the accommodating portion, and the vehicle key is inserted into the key cylinder and rotatable.

In this case, the assembling member is assembled in the body member to constitute the accommodating portion, and the body member and the assembling member constitute the inner surface of the accommodating portion.

For this reason, even in the case where a position of an inner circumferential surface of the accommodating portion at one side and a position of the inner circumferential surface of the accommodating portion at the other side are not matched with each other in a radial direction of the inner circumferential surface of the accommodating portion, if the body member and the assembling member are separately manufactured and the assembling member is assembled in the body member, the accommodating portion can be formed.

As a result, the position of the inner circumferential surface of the accommodating portion at one side and the position of the inner circumferential surface of the accommodating portion at the other side do not need to be matched with each other in the radial direction of the inner circumferential surface of the accommodating portion, and a size of the accommodating portion can be decreased.

In the key apparatus according to the second aspect of the invention, the accommodating portion has the tube portion that is provided with the bottom portion, the body member constitutes the tube portion, and the assembling member constitutes the bottom portion. For this reason, even in the case where a position of an inner circumferential surface of the tube portion at one side and a position of the inner circumferential surface of the tube portion at the other side are not matched with each other in a radial direction of the inner circumferential surface of the tube portion, when the tube portion is manufactured, a mold can be drawn from one side or the other side of the tube portion and the tube portion can be manufactured. As a result, the assembling member is assembled in the body member, thereby forming the accommodating portion.

In the key apparatus according to the third aspect of the invention, the accommodating portion has a tube portion that is provided with a bottom portion, the body member constitutes the tube portion and the bottom portion, and the assembling member constitutes the tube portion. For this reason, even in the case where a position of an inner circumferential surface of the tube portion at one side and a position of the inner circumferential surface of the tube portion at the other side are not matched with each other in a radial direction of the inner circumferential surface of the tube portion, the body member constitutes the inner circumferential surface of the tube portion at one side and the assembling member constitutes the inner circumferential surface of the tube portion at the other side, thereby manufacturing the body member. As a result, the assembling member is assembled in the body member, thereby forming the accommodating portion.

DETAILED DESCRIPTION

First Exemplary Embodiment

Figure 1:
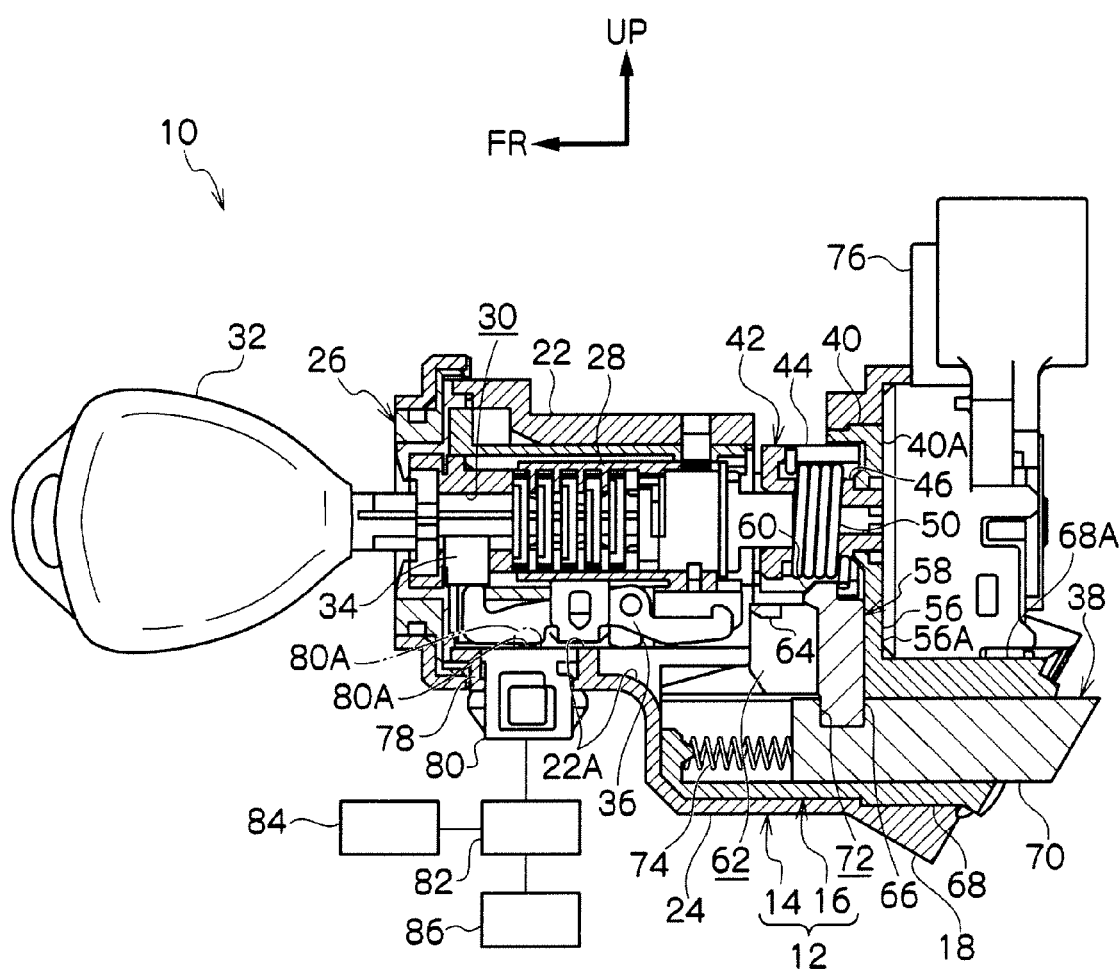
FIG. 1 is a cross-sectional view illustrating a state where a key rotor in a steering lock apparatus according to a first exemplary embodiment of the present invention is disposed at a "LOCK" position and an ignition key is inserted into an insertion hole, when viewed from a left side.
Figure 2:
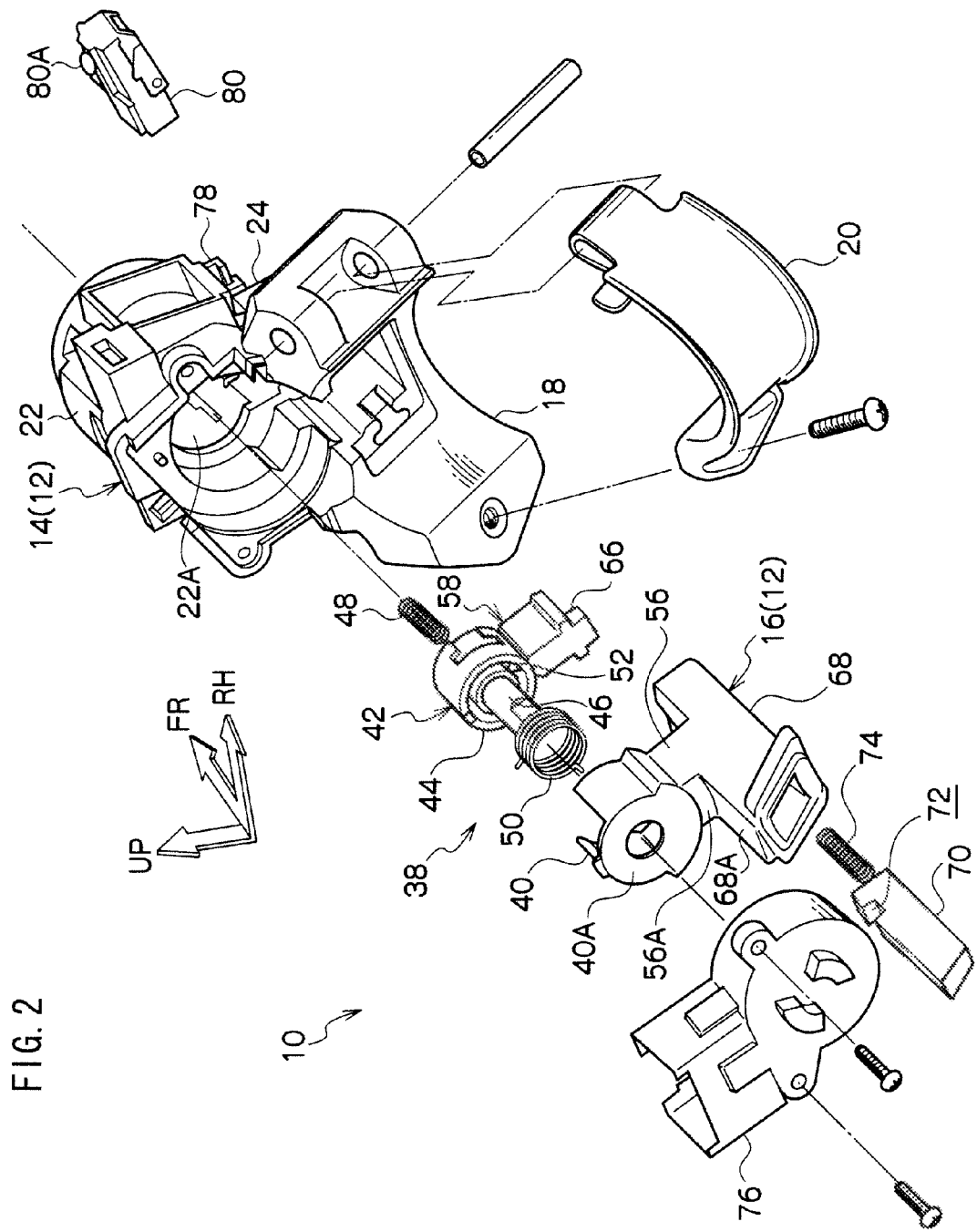
FIG. 2 is an exploded perspective view illustrating a steering lock apparatus according to a first exemplary embodiment of the invention, when viewed from a backward oblique right side.
Figure 3:
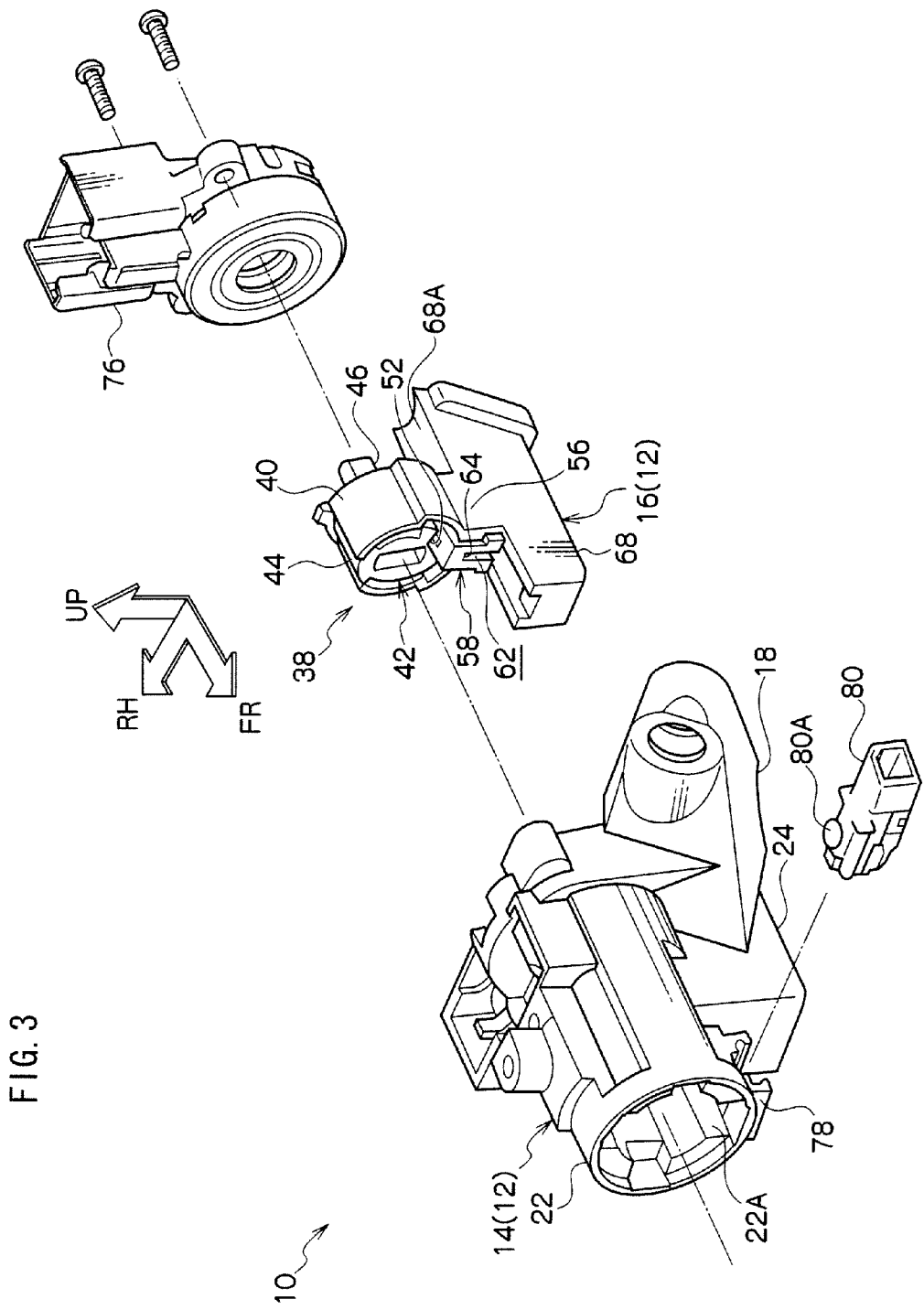
FIG. 3 is an exploded perspective view illustrating a steering lock apparatus according to a first exemplary embodiment of the invention, when viewed from a forward oblique left side.

FIG. 1 is a cross-sectional view illustrating a state of when a steering lock apparatus 10 serving as a key apparatus according to a first exemplary embodiment of the present invention is viewed from a left side. FIG. 2 is an exploded perspective view illustrating a state of when a steering lock apparatus 10 is viewed from a backward oblique right side. FIG. 3 is an exploded perspective view illustrating a state of when a steering lock apparatus 10 is viewed from a forward oblique left side. In the drawings, a front side of the steering lock apparatus 10 is shown by an arrow FR, an upper side of the steering lock apparatus 10 is shown by an arrow UP, and a right side of the steering lock apparatus 10 is shown by an arrow RH.

The steering lock apparatus 10 according to this exemplary embodiment includes a lock body 12 that serves as an accommodating portion. The lock body 12 is configured such that a lock holder 16 serving as an assembling member (dividing member) is assembled in a lock body main portion 14 serving as a body member.

As shown in detail in FIG. 2, at a rear end of a lower portion of the lock body main portion 14, a fixing piece 18 that has an approximately semi-cylindrical shape is formed. In the fixing piece 18, a bracket 20 that has an approximately semi-cylindrical shape is assembled, and a vehicle steering post (not shown) is fitted into the fixing piece 18 and the bracket 20. As a result, the lock body main portion 14 is fixed to the steering post, and the steering lock apparatus 10 is attached to the steering post.

As shown in detail in FIGS. 1 and 3, an accommodating tube 22 that serves as a tube portion and has an approximately cylindrical shape and a generally cylindrical outer surface at its front end is formed at the upper portion of the lock body main portion 14, and an assembling tube 24 that has an approximately rectangular tube shape is formed below the rear portion of the accommodating tube 22. A top surface of the assembling tube 24 is opened, and the assembling tube 24 communicates with the accommodating tube 22. A front surface of the assembling tube 24 is closed, and a rear surface of the assembling tube 24 is opened backward through the fixing piece 18.

As shown in FIG. 1, in the accommodating tube 22 (an inner circumferential surface 22A of the accommodating tube 22), an ignition cylinder 26 that serves as a key cylinder and has an approximately cylindrical shape is accommodated from the front side, and a front end of the ignition cylinder 26 protrudes forward from a front end of the accommodating tube 22. The front end of the ignition cylinder 26 is disposed in an installment panel (not shown) of a vehicle, and a front surface of the ignition cylinder 26 is oriented from the installment panel to a vehicle interior.

A key rotor 28 that has an approximately cylindrical shape is accommodated in the ignition cylinder 26, and the movement of the key rotor 28 in a forward direction is locked. An insertion hole 30 that has a rectangular cylindrical shape is formed in the key rotor 28, and is opened from a front surface of the key rotor 28.

The key rotor 28 is disposed at a "LOCK" position that serves as a predetermined rotation position, and can insert and separate an ignition key 32 (regular key) serving as a key with respect to the insertion hole 30. The key rotor 28 can rotate in the ignition cylinder 26, when the ignition key 32 is inserted into the insertion hole 30 and rotates. As a result, the key rotor 28 can be disposed at an "ACC" position, an "ON" position, and a "START" position. Further, only when the key rotor 28 is disposed at the "LOCK" position, the ignition key 32 can be inserted and separated with respect to the insertion hole 30. When the key rotor 28 can be disposed at the "ACC" position, the "ON" position, and the "START" position, the insertion and separation of the ignition key 32 with respect to the insertion hole 30 are regulated.

Below the front portion of the key rotor 28, a slide piece 34 that has a frame shape of an approximately U character provided to be moved in an upward-to-backward direction (radial direction of the key rotor 28). A lower surface (an external surface of the key rotor 28 in the radial direction) of the slide piece 34 abuts an inner circumferential surface of the ignition cylinder 26, and the movement of the slide piece 34 to the lower side (to the outside of the radial direction of the key rotor 28) is locked. The lower surface of the slide piece 34 is curved along the inner circumferential surface of the ignition cylinder 26, and the slide piece 34 can integrally rotate with the key rotor 28. Further, the lower surface of the slide piece 34 is opened to the lower side through an outer circumferential portion of the ignition cylinder 26.

An upper portion of the slide piece 34 (an inner portion of the key rotor 28 in a radial direction) constitutes an outer circumferential surface of the insertion hole 30 of the key rotor 28. In a state where the ignition key 32 is inserted into the insertion hole 30, the ignition key 32 regulates the movement of the slide piece 34 to the upper side (inner side of the radial direction of the key rotor 28). Meanwhile, in a state where the ignition key 32 is separated from the insertion hole 30, the movement of the slider piece 34 to the upper side is allowed.

In a lower portion of the ignition cylinder 26, a lock plate 36 that has a long plate shape is supported to be movable and rotatable in an upward-to-downward direction in an intermediate portion of a forward-to-backward direction. The lock plate 36 is biased upward and has a front end that is biased in an upward movement direction and a rear end that is biased in a downward movement direction. Front and rear portions of the lock plate 36 are formed in the shape of an approximately L-shaped plate, and the front and rear ends of the lock plate 36 protrude upward.

The front end of the lock plate 36 passes through an outer circumferential portion of the ignition cylinder 26 and abuts the lower surface of the slide piece 34. When the ignition key 32 is inserted into the insertion hole 30, the movement of the slide piece 34 to the upper side is regulated. Therefore, the rotation by a biasing force of the lock plate 36 is regulated. Meanwhile, when the ignition key 32 is separated from the insertion hole 30, the movement of the slide piece 34 to the upper side is allowed. Therefore, the front end of the lock plate 36 moves the slide piece 34 upward by the biasing force. As a result, the front end of the lock plate 36 rotates upward, and the rear end of the lock plate 36 rotates downward. Further, when the key rotor 28 is disposed at the "ACC" position, the "ON" position, and the "START" position, the front end of the lock plate 36 abuts the outer circumferential surface of the key rotor 28. As a result, the rotation by the biasing force of the lock plate 36 is regulated.

The lock holder 16 of the lock body 12 constitutes a lock unit 38, and the lock holder 16 is assembled in the lock body main portion 14. As a result, the lock unit 38 is assembled in the lock body main portion 14.

As shown in FIGS. 1 to 3, a supporting tube 40 that serves as a supporting portion and has an approximately cylindrical shape is formed on an upper portion of the lock holder 16. The supporting tube 40 is fitted (injected) into the accommodating tube 22 of the lock body main portion 14 from the rear side. A rear wall 40A that constitutes a bottom portion and an annular disk shape is provided on a rear surface of the supporting tube 40, and an upper portion of the supporting tube 40 is opened. Together, the inner surfaces of the accommodating tube 22 and the supporting tube 40 form a key cylinder accommodating surface that slidably receives the key rotor 28 at the front end of the accommodating tube 22, and retains the key rotor via a rear wall 40A.

In the supporting tube 40, a cam shaft 42 that serves as a rotation member is rotatably accommodated from the front side. The outer circumferential side of the cam shaft 42 is provided with an outer tube 44 that has an approximately cylindrical shape, and the inner circumferential side of the cam shaft 42 is provided with an inner tube 46 that has an approximately cylindrical shape. The outer tube 44 and the inner tube 46 are integrated with each other, in the front end. Further, the inner tube 46 passes through the rear wall 40A of the supporting tube 40 and protrudes the rear side of the supporting tube 40.

A rear end of the key rotor 28 is fitted into the inner tube 46 from the front side. The cam shaft 42 is rotatable integrally with the key rotor 28 and allows the key rotor 28 to move to the rear side.

A cam gear spring 48 (refer to FIG. 2) is inserted into the inner tube 46 from the front side. The cam gear spring 48 is disposed on the rear side of the key rotor 28, and a rear end of the cam gear spring 48 is locked to the inner tube 46 to bias the key rotor 28 to the front side.

In the outer tube 44, a return spring 50 that serves a rotation biasing portion is accommodated from the rear side, in at the outer circumference of the inner tube 46. One end (front end) of the return spring 50 is locked to the outer tube 44, and the other end (rear end) of the return spring 50 is locked to the supporting tube 40. The return spring 50 biases the cam shaft 42 from the "START" position of the key rotor 28 to the "LOCK" position through the "ON" position and the "ACC" position.

In the lower portion of the outer tube 44, an inclination surface 52 (refer to FIG. 2) is formed. The inclination surface 52 is inclined from the "START" position of the key rotor 28 to the "LOCK" position through the "ON" position and the "ACC" position, as the inclination surface 52 is oriented from the rear side to the front side.

In the intermediate portion of the upward-to-downward direction of the lock holder 16, a guide tube 56 that serves as a guide portion and has an approximately rectangular tube shape is formed. The guide tube 56 is fitted (injected) from the rear side in the vicinity of the lower end of the accommodating tube 22 of the lock body main portion 14. A top surface of the guide tube 56 is opened in the supporting tube 40, and a bottom surface of the guide tube 56 is opened. A rear surface of the guide tube 56 is closed by a rear wall 56A, which constitutes a bottom portion and has an approximately rectangular plate shape.

In the guide tube 56, a slider 58 that serves as a connecting member and has an approximately rectangular pillar shape is fitted from the front side. The slider 58 is guided to the guide tube 56 and movable (slidable) in a forward-to-backward direction.

In a rear portion of the slider 58, a movement protrusion 60 that has a pillar shape is formed. The movement protrusion 60 protrudes upward from the slider 58. The inclination surface 52 of the cam shaft 42 (outer tube 44) comes into contact with the movement protrusion 60 by means of a biasing force of the return spring 50. Thereby, the slider 58 abuts the rear wall 56A of the guide tube 56 and the movement of the slider 58 to the rear side is locked. In addition, the rotation of the cam shaft 42 is stopped, and the key rotor 28 is disposed at the "LOCK" position, as described above.

In the front portion of the slider 58, an engagement hole 62 that has a plate shape is formed at the center of a leftward-to-rightward direction. The engagement hole 62 is opened to the front, upper, and lower sides of the slider 58. In the front and upper ends of the slider 58, an engagement protrusion 64 that has an approximately trapezoidal plate shape is formed. The engagement protrusion 64 is disposed in the engagement hole 62. An assembling protrusion 66 that has a rectangular pillar shape is formed in the rear end of the slider 58. The assembling protrusion 66 protrudes downward from the slider 58.

In the lower portion of the lock holder 16, a holding tube 68 that serves as a holding portion and an approximately rectangular tube shape is formed. The holding tube 68 is fitted (injected) into the lower end of the accommodating tube 22 of the lock body main portion 14 and the assembling tube 24, from the rear side. A top surface of the holding tube 68 is opened in a front portion, and the holding tube 68 communicates with the accommodating tube 22 and the guide tube 56. The top surface of the holding tube 68 is closed by an upper wall 68A that constitutes a bottom portion and has an approximately rectangular plate shape, in a rear portion. A front surface of the holding tube 68 is partially closed.

In the holding tube 68, a lock bar 70 that serves as a lock member and has an approximately rectangular pillar shape is fitted from the front side. The lock bar 70 is guided to the holding tube 68 and movable (slidable) in a forward-to-backward direction.

In an upper end of the front portion of the lock bar 70, an assembling concave portion 72 that has a rectangular pillar shape is formed. The assembling concave portion 72 is opened from the lock bar 70 to the upper side. In the assembling concave portion 72, an assembling protrusion 66 of the slider 58 is fitted. The lock bar 70 is movable in a forward-to-backward direction integrally with the slider 58.

In the holding tube 68, a compression spring 74 that serves as a lock biasing portion is inserted from the rear side. The compression spring 74 is laid between the front end of the holding tube 68 and the front end of the lock bar 70, and biases the lock bar 70 and the slider 58 to the rear side. Thereby, by means of a biasing force of the return spring 50 and the compression spring 74, the slider 58 abuts the rear wall 56A of the guide tube 56, and the movement of the slider 58 and the lock bar 70 to the rear side is locked.

The lock bar 70 protrudes from the holding tube 68 to the rear side and protrudes from the fixing piece 18 of the lock body main portion 14 to the rear side. The lock bar 70 passes through the steering post and is engaged with a steering shaft (not shown) in the steering post. As a result, the rotation of the steering shaft is locked, and a steering wheel (not shown) that is fixed to the upper end of the steering shaft is locked.

In the accommodating tube 22 of the lock body main portion 14, an ignition switch 76 is fixed from the rear side. The ignition switch 76 is disposed to the rear sides of the supporting tube 40 of the lock holder 16 and the guide tube 56. Thereby, the lock holder 16 is prevented from being separated from the lock body main portion 14.

In the ignition switch 76, a rear end of the inner tube 46 of the cam shaft 42 is inserted. Thereby, the cam shaft 42 is connected to the ignition switch 76. The key rotor 28 rotates and the cam shaft 42 integrally rotates, thereby enabling the ignition switch 76 to be operated.

In the lower end of the accommodating tube 22 of the lock body main portion 14, an attaching portion 78 is formed in the front portion. A top surface of the attaching portion 78 constitutes an inner circumferential surface 22A of the accommodating tube 22. In the inner circumferential surface 22A of the accommodating tube 22, a portion of the attaching portion 78 is disposed on the upper side (the inner side of a radial direction of the inner circumferential surface 22A) with respect to a rear portion more than the attaching portion 78.

In the attaching portion 78, a key warning switch 80 (unlock warning switch) that has a rectangular solid shape is attached. On an upper portion of the key warning switch 80, a switch 80A that has an approximately columnar shape is provided. The switch 80A can be biased to the upper side and can protrude upward from the key warning switch 80, and is exposed in the accommodating tube 22.

As described above, when the rotation of the front end of the lock plate 36 to the upper side by means of the biasing force is regulated, the switch 80A is pressed to the lower side by the front portion of the lock plate 36. Meanwhile, as described above, when the front end of the lock plate 36 rotates to the upper side by means of a biasing force, the pressing state of the switch 80A to the lower side by the front portion of the lock plate 36 is released. Thereby, the switch 80A protrudes to the upper side by means of the biasing force from the key warning switch 80.

The key warning switch 80 is connected to a control device 82 of the vehicle. The control device 82 is connected to a warning device 84, and the warning device 84 can give warning (for example, a warning sound) under the control from the control device 82. The control device 82 is connected to a detecting device 86 and the detecting device 86 can detect a closing/opening state of a vehicle door (not shown).

Next, the functions and effects of this exemplary embodiment will be described.

In the steering lock apparatus 10 that has the above-described configuration, the key rotor 28 and the cam shaft 42 are disposed at the "LOCK" position, and a lock bar 70 protrudes from the fixing piece 18 (holding tube 68 of the lock holder 16) of the lock body main portion 14 to the rear side and is engaged with the steering shaft. As a result, the rotations of the steering shaft and the steering wheel are locked.

Further, if the ignition key 32 is inserted into the insertion hole 30 of the key rotor 28 and rotationally operated, the key rotor 28 and the cam shaft 42 rotate to the "ACC" position, the "ON" position, and the "START" position against the biasing force of the return spring, and the ignition switch 76 is operated.

When the key rotor 28 and the cam shaft 42 rotate from the "LOCK" position to the "ACC" position, the inclination surface 52 of the cam shaft 42 (outer tube 44) rotates and presses the movement protrusion 60 of the slider 58 to the front side. As a result, the slider 58 and the lock bar 70 moves to the front side against the biasing force of the compression spring 74.

For this reason, when the key rotor 28 and the cam shaft 42 rotates to the "ACC" position, the protrusion state of the lock bar 70 from the fixing piece 18 of the lock body main portion 14 is released, and the engagement state of the lock bar 70 to the steering shaft is released. Thereby, the rotations of the steering shaft and the steering wheel are allowed.

Further, when the key rotor 28 and the cam shaft 42 rotates from the "LOCK" position to the "ACC" position, as described above, the slider 58 moves to the front side. As a result, the rear end of the lock plate 36 temporarily moves to the lower side against the biasing force, and thus, the engagement protrusion 64 of the slider 58 overrides the rear end of the lock plate 36. Thereby, the engagement protrusion 64 of the slider 58 is engaged with the rear end of the lock plate 36, and the movement of the slider 58 and the lock bar 70 to the rear side by means of the biasing force of the compression spring 74 is locked.

When the key rotor 28 and the cam shaft 42 are disposed in a range of the "START" position from the "ACC" position through the "ON" position, the front end of the lock plate 36 abuts a peripheral surface of the key rotor 28. As a result, the rotation of the rear end of the lock plate 36 to the lower side is regulated, and a state where the engagement protrusion 64 of the slider 58 is engaged with the rear end of the lock plate 36 is maintained. Further, when the key rotor 28 and the cam shaft 42 rotate from the "ACC" position to the "LOCK" position, the ignition key 32 regulates the movement of the slide piece 34 to the inner side of the radial direction of the key rotor 28, and the front end of the lock plate 36 abuts the slide piece 34. As a result, the rotation of the rear end of the lock plate 36 to the lower side is regulated, and a state where the engagement protrusion 64 of the slider 58 is engaged with the rear end of the lock plate 36 is maintained.

Thereby, a state where the movements of the slider 58 and the lock bar 70 to the rear side by means of the biasing force of the compression spring 74 are locked is maintained, and a state where the protrusion of the lock bar 70 from the fixing piece 18 of the lock body main portion 14 is released is maintained. For this reason, the rotations of the steering shaft and the steering wheel are continuously allowed.

Meanwhile, when the key rotor 28 and the cam shaft 42 are disposed at the "LOCK" position and the ignition key 32 is drawn from the insertion hole 30 of the key rotor 28, the movement of the slide piece 34 to the inner side of the radial direction of the key rotor 28 is allowed. As a result, the slider piece 34 moves to the inner side of the radial direction of the key rotor 28, and the front end of the lock plate 36 rotates to the upper side, by means of the biasing force. Thereby, the rear end of the lock plate 36 rotates to the lower side, and the engagement state of the engagement protrusion 64 of the slider 58 to the rear end of the lock plate 36 is released. Thus, the slider 58 and the lock bar 70 move to the rear side by means of the biasing force of the compression spring 74, and the lock bar 70 protrudes from the fixing piece 18 of the lock body main portion 14 to the rear side. For this reason, the lock bar 70 is engaged with the steering shaft, and the rotations of the steering shaft and the steering wheel are locked.

Further, in the key warning switch 80, when the ignition key 32 is inserted into the insertion hole 30 of the key rotor 28, the front end of the lock plate 36 abuts the peripheral surface of the key rotor 28 or the slide piece 34, and the rotation of the front portion of the lock plate 36 to the upper side is regulated. For this reason, the switch 80A of the key warning switch 80 is pressed to the lower side by the front portion of the lock plate 36. In this state, when the detecting device 86 detects that the door is opened, the warning device 84 gives warning.

Meanwhile, when the ignition key 32 is not inserted into the insertion hole 30 of the key rotor 28, the slide piece 34 moves to the inner side of the radial direction of the key rotor 28, and the front portion of the lock plate 36 rotates to the upper side by means of the biasing force, thereby releasing the pressing state of the switch 80A to the lower side by the front portion of the lock plate 36. In this state, when the detecting device 86 detects that the door is opened, the warning device 84 does not give warning.

Meanwhile, the lock body 12 is divided into the lock body main portion 14 and the lock holder 16, and the lock holder 16 is assembled (injected) in the lock body main portion 14 from the rear side, thereby constituting the lock body 12.

In this case, in the accommodating tube 22 of the lock body main portion 14, both ends in an axial direction are opened. For this reason, even though the inner circumferential surface 22A of the portion (front portion) of the attaching portion 78 of the accommodating tube 22 is disposed on the upper side (inner side of the radial direction of the inner circumferential surface 22A) with respect to the inner circumferential surface 22A of the rear portion more than the attaching portion 78 of the accommodating tube 22, when the accommodating tube 22 is manufactured, a mold that manufactures the portion of the attaching portion 78 of the accommodating tube 22 can be drawn from the front side of the accommodating tube 22, a mold that manufactures a rear portion more than the attaching portion 78 of the accommodating tube 22 can be drawn from the rear side of the accommodating tube 22, and the accommodating tube 22 can be manufactured. If the lock holder 16 is assembled in the lock body main portion 14 from the rear side, the rear end of the accommodating tube 22 can be closed by the rear wall 40A of the supporting tube 40 in the lock holder 16, the rear wall 56A of the guide tube 56, and the upper wall 68A of the holding tube 68.

Thereby, the position of the inner circumferential surface 22A of the portion of the attaching portion 78 of the accommodating tube 22 does not need to be matched with the position of the inner circumferential surface 22A of the rear portion more than the attaching portion 78 of the accommodating tube 22 in the radial direction of the inner circumferential surface 22A. The portion of the attaching portion 78 of the accommodating tube 22 can be disposed on the upper side (inner side of the radial direction of the accommodating tube 22) with respect to the rear portion more than the attaching portion 78 of the accommodating tube 22, and the key warning switch 80 can be disposed on the upper side (inner side of the radial direction of the accommodating tube 22). Accordingly, the front portion of the lock body 12 (portion of the ignition key 32 at the assembling side) can be made to have a small size, and the front portion of the steering lock device 10 can be made to have a small size.

Second Exemplary Embodiment

Figure 4:
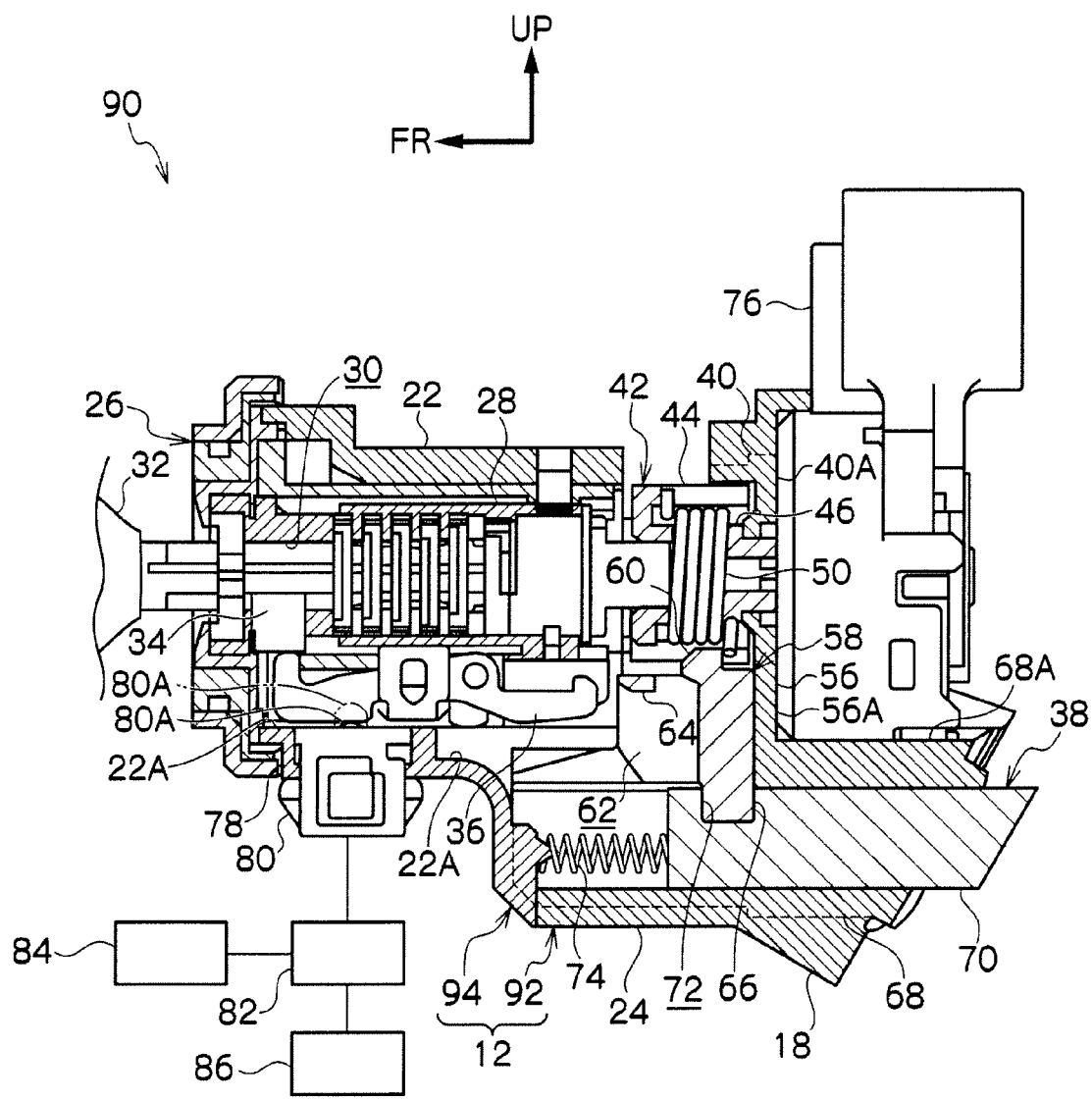
FIG. 4 is a cross-sectional view illustrating a state where a key rotor in a steering lock apparatus according to a second exemplary embodiment of the invention is disposed at a "LOCK" position and an ignition key is inserted into an insertion hole, when viewed from a left side.

FIG. 4 is a cross-sectional view illustrating a state where a steering lock apparatus 90 serving as a key apparatus according to a second exemplary embodiment of the invention is viewed from a left side. In this drawing, a front side of the steering lock apparatus 90 is shown by an arrow FR and an upper side of the steering lock apparatus 90 is shown by an arrow UP.

The steering lock apparatus 90 according to this exemplary embodiment has the same configuration as the steering lock apparatus according to the first exemplary embodiment, except for the following configuration.

In the steering lock apparatus 90 according to this exemplary embodiment, the lock body 12 is assembled in a lock body main portion 92 that serves as a body member, and a switch holder 94 that serves as an assembling member (dividing member) is assembled.

The lock body main portion 92 constitutes the portion other than the front portions of the assembling tube 24 and the attaching portion 78 of the lock body main portion 14 in the first exemplary embodiment. Further, the lock body main portion 92 constitutes the portion other than the front end of the holding tube 68 of the lock holder 16 in the first exemplary embodiment, and is integrated with most of the lock holder 16.

A switch holder 94 constitutes the front ends of the assembling tube 24 and the attaching portion 78 of the lock body main portion 14 in the first exemplary embodiment. Further, the switch holder 94 constitutes the front end of the holding tube 68 of the lock holder 16 in the first exemplary embodiment.

The switch holder 94 is fixed to a front portion of a lower portion of the lock body main potion 92 by means of a pin.

In the supporting tube 40 of the lock body main portion 92, the cam shaft 42, the cam gear spring 48, and the return spring 50 are assembled from the front side of the accommodating tube 22 through the accommodating tube 22. Further, in the guide tube 56 of the lock body main portion 92, the slider 58 is assembled from the front side of the accommodating tube 22 through the accommodating tube 22.

In the holding tube 68 of the lock body main portion 92, the lock bar 70 and the compression spring 74 are assembled from the rear side, and the compression spring 74 is laid between the front end of the holding tube 68 in the switch holder 94 and the front end of the lock bar 70. Further, in the lock body main portion 92, an assembling protrusion 66 of the slider 58 is fitted to an assembling concave portion 72 of the lock bar 70.

Meanwhile, as described above, the lock body 12 is divided into the lock body main portion 92 and the switch holder 94 and the switch holder 94 is assembled (fixed) in the lock body main portion 92, thereby constituting the lock body 12.

In this case, the switch holder 94 constitutes the portion of the attaching portion 78 of the accommodating tube 22, and the lock body main portion 92 constitutes the portion other than the attaching portion 78 of the accommodating tube 22. For this reason, even though the inner circumferential surface 22A of the portion (front portion) of the attaching portion 78 of the accommodating tube 22 is disposed on the upper side (inner side of the radial direction of the inner circumferential surface 22A) with respect to the inner circumferential surface 22A of the rear portion more than the attaching portion 78 of the accommodating tube 22, when the lock body main portion 92 is manufactured, a mold that manufactures the portion other than the attaching portion 78 of the accommodating tube 22 can be drawn from the front side of the accommodating tube 22, and the lock body main portion 92 can be manufactured. If the switch holder 94 is assembled in the lock body main portion 92 from the front side or the lower side, it is possible to form the entire portion that includes the attaching portion 78 of the accommodating tube 22.

Thereby, the position of the inner circumferential surface 22A of the portion of the attaching portion 78 of the accommodating tube 22 does not need to be matched with the position of the inner circumferential surface 22A of the rear portion more than the attaching portion 78 of the accommodating tube 22 in the radial direction of the inner circumferential surface 22A. The portion of the attaching portion 78 of the accommodating tube 22 can be disposed on the upper side (inner side of the radial direction of the accommodating tube 22) with respect to the rear portion more than the attaching portion 78 of the accommodating tube 22, and the key warning switch 80 can be disposed on the upper side (inner side of the radial direction of the accommodating tube 22). Accordingly, the front portion of the lock body 12 (portion of the ignition key 32 at the assembling side) can be made to have a small size, and the front portion of the steering lock device 10 can be made to have a small size.

In this way, even in this exemplary embodiment, the same functions and effects as those in the first exemplary embodiment can be achieved.

What is claimed is:

1. A key apparatus, comprising:
    a warning switch;
    a key cylinder that is rotatable when a vehicle key is inserted; and
    an accommodating portion in which an assembling member is assembled in a body member having a inner surface open at both ends, and the assembling member having a rear wall such that the body member and the assembling member form a key cylinder accommodating surface that retains the key cylinder at a back end and that slidably receives the key cylinder at a front end,
    wherein the body member further includes an outer cylindrical surface at its front end that includes an attaching portion that attaches the warning switch.

2. The key apparatus according to claim 1, wherein the body member includes a tube portion which, in combination with the rear wall of the assembling member defines in its interior the key cylinder accommodating surface.

3. The key apparatus according to claim 2, wherein the tube portion comprises:
    an accommodating tube having an approximately cylindrical shape and being formed at an upper portion of the body member; and
    an assembling tube having an approximately rectangular tube shape and being formed below a rear portion of the accommodating tube,
    wherein the assembling tube is spaced away from the front end of the accommodating tube.

4. The key apparatus according to claim 3, further comprising: a holding portion having an approximately rectangular tube shape and being formed in a lower portion of the assembling member,
    wherein the holding portion is inserted into a lower end of the accommodating tube of the body member and into the assembling tube, from a backside.

5. The key apparatus according to claim 4, further comprising: a lock member having an approximately rectangular pillar shape and being fitted in the holding portion from a front side,
    wherein the lock member is guided to the holding portion and is slidable in a forward-rear direction.

6. The key apparatus according to claim 5, further comprising: a lock biasing portion inserted in the holding portion from the rear side,
    wherein the lock biasing portion is laid between a front end of the holding portion and a front end of the lock member, and biases the lock member to the rear side.

7. The key apparatus according to claim 1, wherein the assembling member further includes a supporting tube that defines a cylindrical inner surface that is coaxially aligned with the inner surface of the body member.

8. A key apparatus, comprising:
    a warning switch;
    a key cylinder that is rotatable when a vehicle key is inserted; and
    an accommodating portion in which an assembling member is assembled in a body member having an inner surface open at both ends, and the assembling member having a rear wall such that the body member and the assembling member form a key cylinder accommodating surface that retains the key cylinder at a back end and that slidably receives the key cylinder at a front end,
    wherein the body member further includes an outer cylindrical surface at its front end that includes an attaching portion that attaches the warning switch, and a tube portion which, in combination with the rear wall of the assembling member defines in its interior the key cylinder accommodating surface, wherein the tube portion includes:
    an accommodating tube having an approximately cylindrical shape and being formed at an upper portion of the body member; and
    an assembling tube having an approximately rectangular tube shape and being formed below a rear portion of the accommodating tube,
    wherein the assembling tube is spaced away from the front end of the accommodating tube to form the outer cylindrical surface at the front end of the body member that includes the attaching portion that attaches the warning switch.

* * * * *